United States Patent [19]
Amano

[11] Patent Number: 5,021,611
[45] Date of Patent: Jun. 4, 1991

[54] WATERPROOF JOINT FOR WIREHARNESS

[75] Inventor: Masataka Amano, Shizuoka, Japan

[73] Assignee: Yazaki Corporation, Japan

[21] Appl. No.: 417,790

[22] Filed: Oct. 5, 1989

[30] Foreign Application Priority Data

Oct. 7, 1988 [JP]  Japan .......................... 63-131023[U]
Dec. 9, 1988 [JP]  Japan .......................... 63-160171[U]

[51] Int. Cl.$^5$ ......................................... H02G 15/113
[52] U.S. Cl. .................................... 174/88 R; 29/868; 156/49
[58] Field of Search ................. 174/77 R, 84 R, 88 R, 174/92; 156/49; 29/868, 871, 872

[56] References Cited

U.S. PATENT DOCUMENTS

| 3,467,761 | 9/1969 | Plummer | 174/DIG. 8 X |
| 4,532,168 | 7/1985 | Steele et al. | 174/92 X |
| 4,590,328 | 5/1986 | Kunze | 174/77 R X |
| 4,647,716 | 3/1987 | Akiyama et al. | 174/77 R |
| 4,693,767 | 9/1987 | Grzanna et al. | 174/77 R X |

FOREIGN PATENT DOCUMENTS

| 120437 | 10/1984 | European Pat. Off. | 174/77 R |
| 141889 | 1/1979 | German Democratic Rep. | 174/84 R |
| 5217686 | 7/1975 | Japan . | |
| 62-123072 | 8/1987 | Japan . | |
| 2132039 | 6/1984 | United Kingdom | 174/92 |

Primary Examiner—Morris H. Nimmo
Attorney, Agent, or Firm—Wigman & Cohen

[57] ABSTRACT

Disclosed herein is a waterproof joint for a joint section of a plurality of wires of a wireharness, each wire having a conductor and an insulating cover surrounding the conductor, and the joint section comprises a connecting portion of the conductors and the insulating covers of the wires near the connecting portion. The waterproof joint comprises a thermally shrinkable joint member including a thermally shrinkable sheet having an inner surface and a thermoplastic layer of thermoplastic material formed on the inner surface of the thermally shrinkable member, the thermally shrinkable member being adapted to be wound around the joint section in such a manner that the thermally shrinkable layer faces the joint section, and a secondary sealing member formed of a thermoplastic material for filling up spaces between the wires of the joint section when heat is applied thereto in cooperation with the thermoplastic material of the thermoplastic layer, the secondary sealing means being provided within the thermally shrinkable joint member. Therefore, when heat is applied to the thermally shrinkable joint member, the thermally shrinkable sheet is shrunk and the thermoplastic material of the thermally shrinkable layer and the secondary sealing means is melted, after which the melted thermoplastic material spreads within the thermally shrinkable sheet so as to seal spaces between the thermally shrinkable sheet and the wires by penetrating into the spaces between the wires with the assistance of of the shrinking force from the thermally shrinkable sheet.

16 Claims, 11 Drawing Sheets

WATERPROOF JOINT FOR WIREHARNESS

BACKGROUND OF THE INVENTION

1. Field of the Invention

The present invention relates to a waterproof joint for wireharness, and in particular to a waterproof joint for improving waterproofness at a wire connecting portion of wires of the wireharness.

2. Description of the Prior Art

Conventionally, various types waterproof structures for use in a wire connecting portion of wires of wireharness (herein after referred to as "joint section") have been proposed, since if water enters the joint section of the wireharness there may be caused many problems such as heating of resistors and ill-conduction because of generation of rust, or the like.

FIGS. 1 to 3 show one of such conventional waterproof structures for a joint section of a wireharness. In this waterproof structure, the joint section 150 in which a branch electrical wire 130 is connected to a main electrical wire 100 is embedded in a synthetic resin by injection molding so as to prevent water from entering therein.

Specifically, as shown in FIG. 1, in this joint section 150, an exposed conductor 140 of the wire 130 which is formed by partially stripping an insulating cover of the wire 130 is connected through a joint metal 200 to an exposed conductor 120 of the main wire 100 which is also formed by partially stripping an insulating cover 110 of the wire 100. The thus formed joint section 150 which is constituted from a connecting portion of the conductors and a part of the insulating cover of each of wires connected together is put into injection mold dies 300 and 300' as shown in FIG. 2. Thereafter, a synthetic resin that is softened by heat is poured into the dies 300 and 300', and then cooled and hardened, so that the joint section 150 is embedded in the synthetic resin 400 to form a waterproof joint as shown in FIG. 3.

FIGS. 4(a) and (b) show another conventional waterproof joint structure, in which a joint section of a wireharness is covered with a sealing member 500. In this waterproof structure, a joint section 150 of the main wire 100 and the branch wire 130 of the wireharness is formed in the same manner as the above prior art. Thus formed joint section 150 is covered with the sealing member 500 which includes an insulating sheet 510 and viscous and elastic waterproof compound 520 applied inside the insulating seat 510 in such a manner that the viscous and elastic waterproof compound 520 is placed on the inner side of the sealing member 500 when it is attached to the joint section 150.

FIG. 5 shows yet another conventional waterproof joint structure. Such type of waterproof joint structure is, for example, disclosed in Japanese Laid-open Patent Publication No. 52-17686 or Japanese Laid-open Utility Model Publication No. 62-123072. In this conventional waterproof joint, a joint section which has the same structure as those of the conventional joint sections as described above is covered with a thermal shrinkable tube 600. The thermally shrinkable tube 600 comprises an elastic thermal plastic adhesive 700 such as a heat fusion seal material or a butyl rubber applied on the inner side of the heat shrinkable tube 600. When the thermally shrinkable tube 600 is heated, the thermal plastic adhesive 700 is melted and then penetrates around the joint section 150 and into gaps or spaces between the wires 100 and 130 to achieve a seal of the joint section 150.

However, in the first conventional waterproof joint, although a sealing ability thereof is good, it requires to prepare molding equipment such as molding dies and an injection molding apparatus, thus leading to high costs in manufacturing the waterproof joints. Further, in this waterproof joint, it is necessary to prepare different type mold dies according to the types or sizes of wires to be connected, thus leading to troublesome parts control for the waterproof joints. Furthermore, there is another problem in that many branch wires can not be connected to the main wire due to space limitations in the dies. Moreover, in this waterproof joint, since it was required to put the joint section at the center of the dies in order to give a good sealability to the joint section, it was also necessary to accurately position the joint section with respect to the dies. This positioning operation is also troublesome.

Further, in the second conventional waterproof joint, it is necessary for the insulating sheet 510 to be massaged manually in order to fill the viscous waterproof compound 520 into spaces between the cables 100 130 when it is attached to the joint section 150. This means that productivity of the waterproof joint is not so good and that there is a possibility that some spaces or gaps would remain around the joint section, which deteriorates the sealability, so that quality stability may also be deteriorated.

Furthermore, in the third conventional waterproof joint employing the thermally shrinkable tube, there is a problem that if the number of wires to be connected is increased, the thermal plastic adhesive may not completely penetrate into spaces between the wires, thus resulting in unfavourable spaces therein. Further, according to this waterproof joint, since the thermally shrinkable tube is likely to be displaced with respect to the joint section 150 before heat is applied, there is a possibility that a part of the joint section 150 would be exposed from the tube. Furthermore, when the thermally shrinkable tube is attached to the joint section, the positioning of the tube with respect to the joint section is performed visually by an operator. Therefore, there is an unfavourable possibility that the joint section 150 would not be entirely covered by the thermally shrinkable tube, thus leaving a part of the joint section exposed or that uneven distribution of the thermal plastic adhesive would be caused in the tube, thus leasing to deterioration of the waterproofness of the waterproof joint.

SUMMARY OF THE INVENTION

In view of these problems in the conventional waterproof joints, this invention has been made. Accordingly, a main object of the present invention is to provide a waterproof joint for a wireharness which does not need molding dies and injection molding equipment when it is attached to a joint section in which a plurality of wires of the wireharness are connected together.

The other object of the present invention is to provide a waterproof joint for a wireharness which can seal a joint section in which a lot of wires are connected together.

Another object of the present invention is to provide a waterproof joint for wireharness which has quality stability by preventing the formation of spaces which are not filled with a thermoplastic resin.

Yet another object of the present invention is to provide a method for manufacturing a waterproof joint for a wireharness which can provide good waterproofness to a joint section with simple structure and good productivity.

In accordance with the present invention, therefore, a waterproof joint for a joint section of a plurality of wires of a wireharness, in which each wire has a conductor and an insulating cover surrounding the conductor and the joint section comprises a connecting portion of the conductors and the insulating covers near the connecting portion, comprises a thermally shrinkable joint member for sealing and covering the joint section and a secondary sealing member applied onto the the joint section. The thermally shrinkable joint member has a thermally shrinkable sheet which will be shrunk when heat is applied thereto and a thermoplastic layer which will be melted when heat is applied thereto formed on the inner surface thereof. The secondary sealing member is formed from a thermoplastic material, which will be melted when heat is applied thereto. The thermally shrinkable member is wound around the joint section to which the secondary sealing member is applied in such a manner that the inner surface thereof covers the secondary sealing member.

According to the waterproof joint as described above, when heat is applied to the waterproof joint, the thermally shrinkable sheet of the thermally shrinkable joint member is shrunk and the thermoplastic layer of the thermally shrinkable joint member and the second sealing member are melted, and then the melted thermoplastic material is extended within the thermally shrinkable sheet so as to form a seal between the thermally shrinkable sheet and the wires and penetrates into spaces between the wires. Then, the melted thermoplastic material is forced into the spaces by the assistance of the shrinking force from the thermally shrinkable sheet to fill in the spaces completely. Thereafter, when the waterproof joint is cooled, the thermoplastic material that extended and penetrated within the thermally shrinkable sheet is hardened without leaving any space therein. In this condition, not only the wires are bonded to each other through the hardened thermoplastic material but also the thermal shrinkable sheet and the wires are bonded through the hardened thermoplastic material, thereby attaining seal of the joint section.

As a result, according to this waterproof joint, since the waterproof joint can be attached to the joint section of the wireharness only by applying heat thereto, it is not necessary to prepare molding dies and injection molding equipment. Further, since there is provided the secondary sealing member in addition to the thermally shrinkable layer of the thermally shrinkable joint member, there is less possibility that cells or spaces which deteriorate sealability of the waterproof joint will be left in the hardened thermoplastic material of the waterproof joint when the waterproof joint is attached to the joint section, which thereby ensures that the quality of the waterproof joints will be stabilized.

In the present invention having the above structure, it is desirable that the secondary sealing member is formed from at least one molding chip which is to be applied onto one or two insulating cover(s) of the wire(s) or a connecting portion of the joint section. If the molding chip is applied in this way, the melted thermoplastic material will surely penetrate into the spaces between the wires.

Further, it is also desirable that the waterproof joint further comprise means for positioning the joint section with respect to the thermally shrinkable joint member in such a manner that the connecting portion of the joint section is placed at the center of the joint member when the joint member is attached to the joint section. The positioning means is formed from the secondary sealing means which comprise a plurality of rib portions formed on the thermoplastic layer of the thermally shrinkable sheet, between which each wire in the joint section of the wireharness is to be supported. The positioning rib portions are also formed from a thermoplastic resin.

If such rib portions are provided, the positioning of the thermally shrinkable joint member with respect to the joint section can be easily performed. Further, since the rib portions are also formed from a thermoplastic material, they serve to fill in the spaces when melted by applied heat.

Further, in accordance with the present invention, a method for manufacturing a waterproof joint structure for a wireharness, in which the wireharness has a plurality of wires each having a conductor and an insulating cover surrounding the conductor, comprises the steps of connecting the conductors of the wires which are partly exposed together to form a joint section of the wires which comprises a connecting portion of the conductors and a part of the insulating cover of each of the connected wires, applying a molding chip formed from a thermoplastic material onto the joint section, covering the joint section to which the molding chip is attached with a thermally shrinkable joint member which comprises a thermally shrinkable sheet and a thermoplastic layer formed on the inner surface of the thermally shrinkable member in such a manner that the thermoplastic layer is located inside thereof, and applying heat to the thermally shrinkable joint member, whereby the thermally shrinkable member is shrunk and the molding chip and thermoplastic layer are melted, and then the melted thermoplastic resin thereof penetrates into spaces of the wires forcibly with the assistance of the shrinking force of the thermally shrinkable sheet so as not to leave spaces therein, and the thermally shrinkable sheet is tightly bonded to the wires through the thermoplastic material to attain a seal therebetween upon cooling.

In accordance with the method as described above, it becomes possible to manufacture a waterproof joint for a joint section of wireharness which has good sealability without leaving cells or spaces in the hardened thermoplastic material in the waterproof joint and which has good productivity.

These and other objects, features and advantages of the invention will be better understood from the following description with reference to the accompanying drawings.

DETAILED DESCRIPTION OF THE PREFERRED EMBODIMENTS

Referring now to the accompanying drawings, preferred embodiments according to the present invention will be described.

Figure 7A:
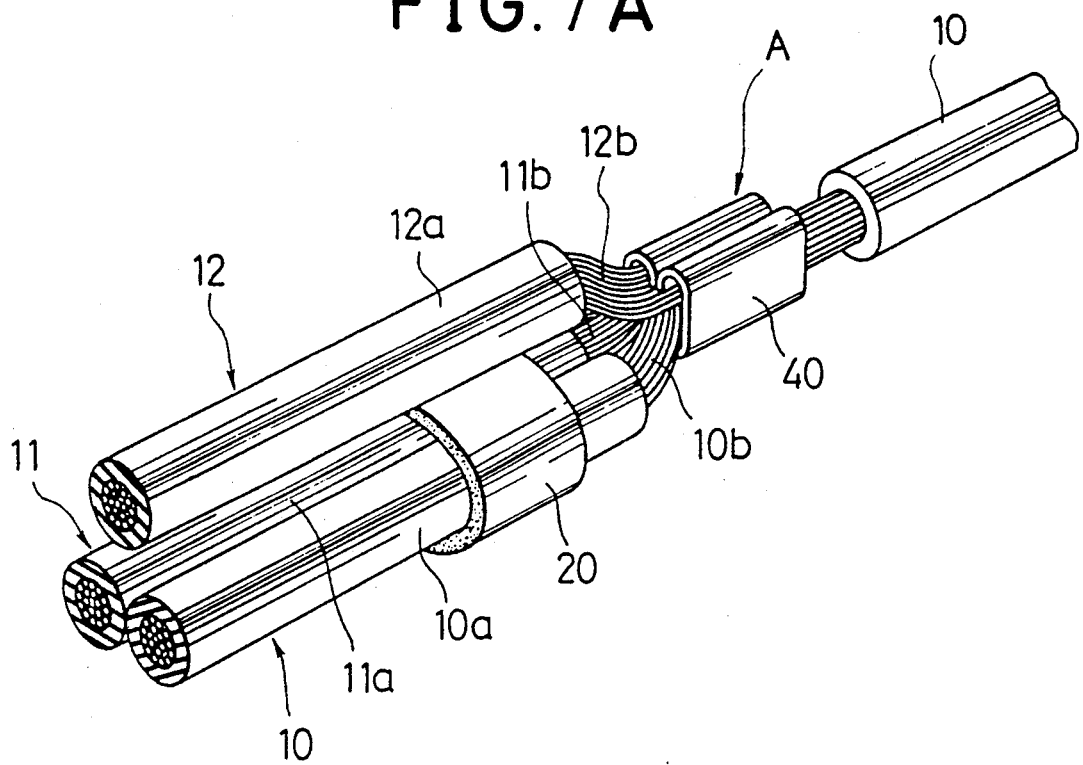
FIG. 7A is a perspective view of a joint section of the wireharness to which a molding chip is attached according to the first embodiment.
Figure 7B:
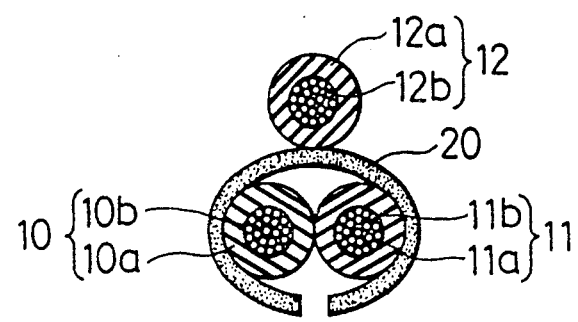
FIG. 7B is a cross-sectional view of the joint section of FIG. 7B.
Figure 8:
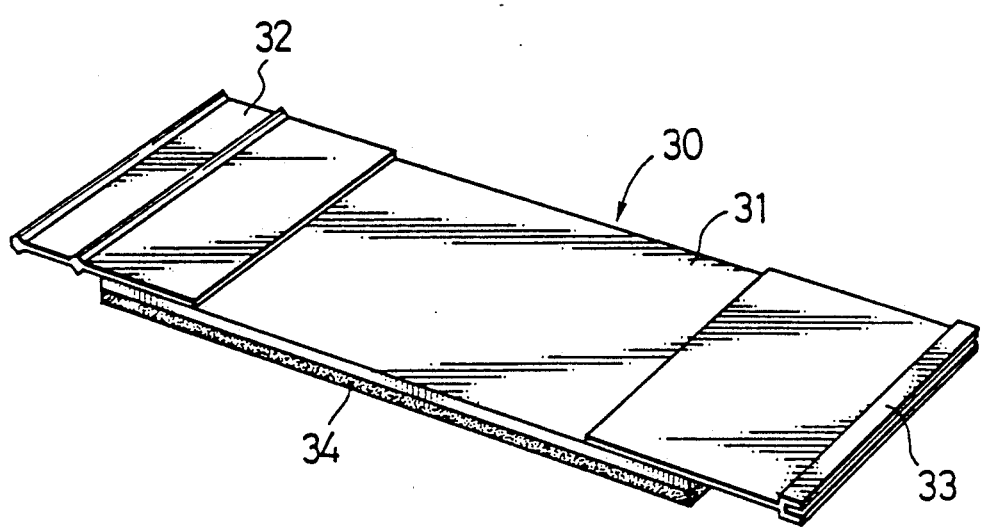
FIG. 8 is a perspective view of a thermally shrinkable member according to the first embodiment.

FIGS. 6 to 8 shows a waterproof joint for a wireharness of the first embodiment according to the present invention.

In these drawings, the reference numerals 10, 11 and 12 denote electrical wires which constitute the wireharness, the reference numeral 20 denotes a molding chip applied to the wires, and the reference numeral 30 denotes a thermally shrinkable member attached to a joint section A of the wires 10, 11 and 12 of the wireharness.

As clearly illustrated in FIG. 7A, in the joint section A, two branch wires 11 and 12 are connected to a main wire 10. Specifically, in the joint section A, an insulating cover of main wire 10 of the main wire is partially stripped in a middle portion thereof to expose a conductor 10b therein, and end parts of insulating covers 11a and 12a of the branch wires 11 and 12 are also partially stripped to expose conductors 11b and 12b therein. The exposed conductors 11b and 12b of the branch wires 11 and 12 are electrically connected to the conductor 10b of the main wire 10 through a joint member 40. Therefore, the joint section A of the wireharness comprises a joint member 40 which is part of a connecting portion of the conductors 10b, 11b and 12b of the wires 10, 11 and 12 and parts of insulating covers 10a, 11a and 12a of the wires 10, 11 and 12 which are located near the connecting portion.

As shown in FIGS. 7A and 7B, around the insulating covers 10b and 11b of the two wires 10 and 11 in the joint section A, there is wound the molding chip 20. In this embodiment, as illustrated in FIG. 7B, the molding chip 20 has a C-shaped configuration which can almost surround the two wires 10 and 11. The molding chip 20 is formed of a thermal plastic material (hot-melt type adhesive) which is a composition containing thermal plastic polymer as a base polymer, various tackifiers, appropriate plasticizers, and so forth, which exist in a solid state at room temperature. This molding chip 20 will be melted when heat is applied thereto and will the harden so as to serve as an adhesive and sealant when cooled. The thermal plastic material of the molding chip 20 is chosen so at to melt at a temperature that is lower than the melting point of the insulating cover of the wire.

The joint member 40 is formed from a conductive metallic thin plate that is bent into a predetermined shape which can connect the conductors 10b, 11b and 12b of the wires 10, 11 and 12 together.

FIG. 8 shows a perspective view of the thermally shrinkable member 30. As shown in the figure, the thermally shrinkable member 30 comprises a flexibly thermally shrinkable sheet 31 having a substantially rectangular shape with two sets of opposite edges. On one of the longitudinal opposite edges, there is formed an engaging protrusion 32, while on the other edge there is formed an engaging groove 33 with which the engaging protrusion 32 is to be engaged. The engaging protrusion 32 and the engaging groove 33 will be engaged together to form a cylindrical shape when the thermally shrinkable member 30 is wound around the joint section A. Further, on the lower surface of the thermally shrinkable joint member 30, there is attached a thermoplastic layer 34. The thermoplastic layer 34 is also formed of a thermoplastic material similar to that of the molding chip 20, which is also in solid state in room temperature. This thermoplastic layer 34 will be melted when heat is applied thereto and then harden so as to serve as an adhesive and sealant when it is cooled. The thermoplastic material of the thermally shrinkable joint member 34 also melts at a temperature that is lower than the melting point of the insulating cover of the wires.

In this case, please note that in a case where more than three wires are to be covered by the waterproof joint, it is preferable that the molding chip 20 is attached to one or two wires. This is because if the molding chip 20 is attached to more than three wires, cells or spaces will be likely to be left therebetween.

As regarding a configuration of the molding chip 20, it is enough for the this molding chip 20 to have a configuration that can be wound around more than one or two wires so as to fill spaces or gaps between the wires. Therefore, as shown in FIGS. 9A to 9G, it is possible to take the following options for the configurations of the molding chips 20 as modifications thereof.

Figure 9A:
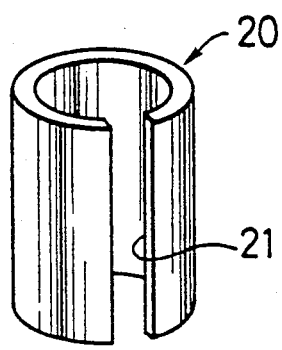
FIGS. 9A to 9G are perspective views of modifications of the molding chip according to the first embodiment, respectively.
Figure 9B:
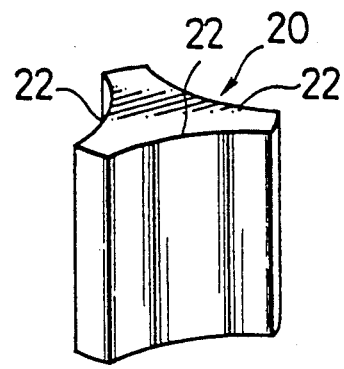
Figure 9C:
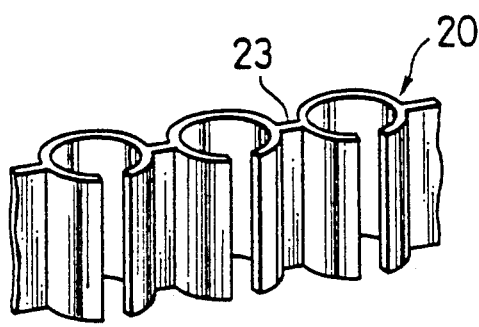
Figure 9D:
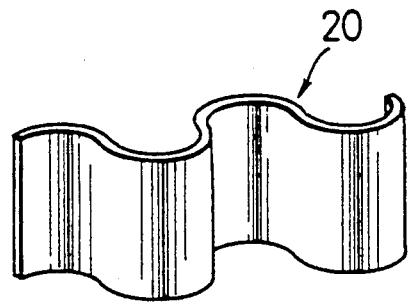
Figure 9E:
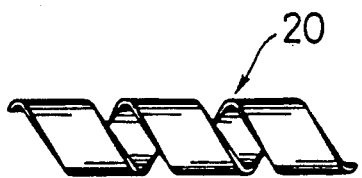
Figure 9F:
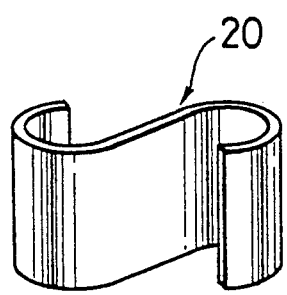
Figure 9G:
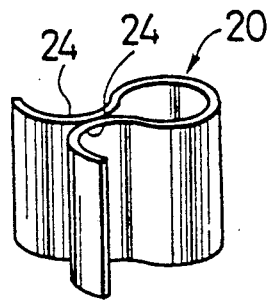

Namely, as shown in FIG. 9A, it is possible to constitute the molding chip 20 as a substantially cylindrical shape having a longitudinal slit 21. Further, as shown in FIG. 9B, it is also possible to constitute the molding chip 20 as a substantially triangle pole shape in which each lateral surface thereof is concavely arched. This modification is suited for insertion between three wires. Furthermore, as shown in FIG. 9C, it is also possible to constitute the molding chip 20 from a plurality of cylindrical chips each having a longitudinal slit and coupled with a rib 23. Further, as shown in FIGS. 9D to 9F, it is also possible to constitute the molding chip 20 as a corrugated configuration, a helical configuration and a S-shaped configuration, respectively. Furthermore, as shown in FIG. 9G, it is also possible to constitute the molding chip 20 as a configuration which has a cylindrical portion 24 and two U-shaped portions integrally formed on the cylindrical portion 24.

Figure 10A:
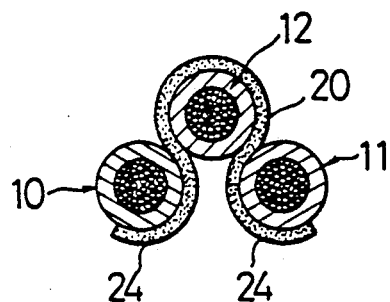
FIGS. 10A to 10D are cross-sectional views each showing a condition that a molding chip is applied to wires of the joint section.
Figure 10B:
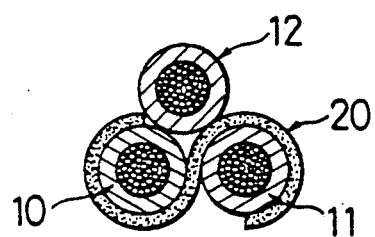
Figure 10C:
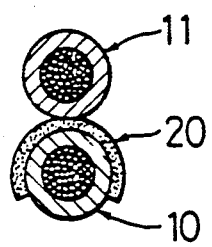
Figure 10D:
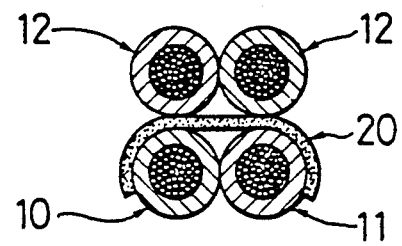
Figure 11:
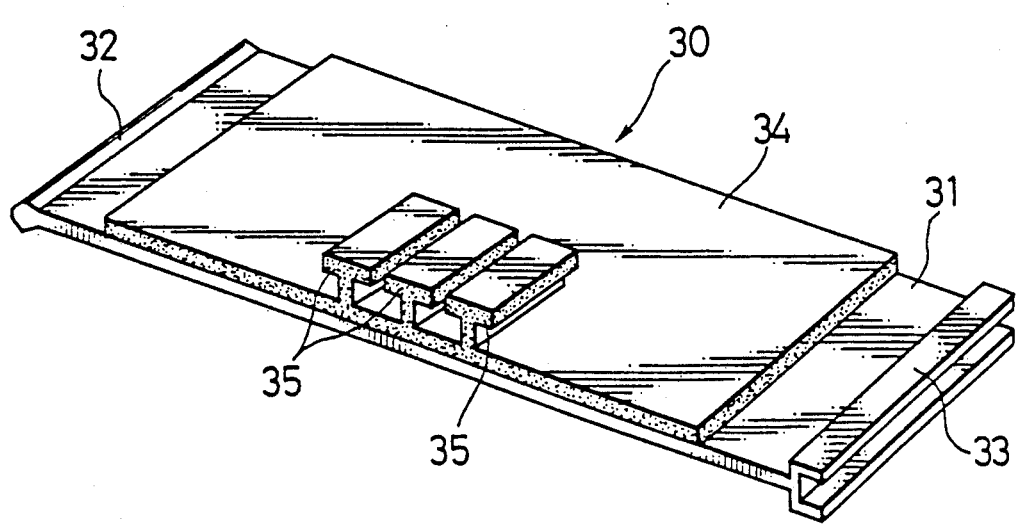
FIG. 11 is a perspective view of a waterproof joint according to a second embodiment of the present invention.

FIGS. 10A to 10D are cross-sectional views each showing a condition in which the molding chip 20 is attached to the wires. As shown in these drawings, it is preferable that the molding chip 20 covers the outer periphery of the wires as much as possible. In particular, as shown in FIG. 10D, when four wires are provided, the molding chip 20 should be wound around two wires in the four wires.

When the waterproof joint of this embodiment is used in order to seal the joint section A in which the wires 10, 11 and 12 are connected together through the joint member 40, first the molding chip 20 is applied or attached onto the insulating covers 10a and 11b of the wires 10 and 11. The reason why the molding chip 20 is employed here is that the thermoplastic material 34 applied to the thermally shrinkable joint member 30 is insufficient for filling the space or gap completely. Therefore, it is necessary to provide such a molding chip 20 in addition to the thermoplastic layer 34 in order to have good sealability. Therefore, in a case where two wires are to be connected to three wires, it is preferable that two molding chips 20 are attached or applied to each of the two and three wires.

Thereafter, the thermally shrinkable sheet 31 of the thermally shrinkable joint member 30 is wound around the joint section A in such a manner that the thermoplastic layer 34 covers the joint portion A entirely, and then the engaging protrusion 32 of the thermally shrinkable sheet 31 is engaged with the engaging groove 33, so that the thermally shrinkable joint member 30 is attached to the joint section A. In this condition, heat at a temperature that will not melt the insulating covers 10a, 11a and 12a but melt only the thermoplastic material of the molding chip 20 and thermally shrinkable layer 34 is applied to the waterproof joint. Then, the thermally shrinkable sheet 31 is shrunk and the thermoplastic resin of the molding chip 20 and the thermally shrinkable layer 30 is melted. The melted thermoplastic resin then penetrates or extends into any gaps or spaces between the wires. In this case, the pressure caused by the shrinking force in the thermally shrinkable sheet 31 assists in forcing the melted thermoplastic resin into the gaps.

Figure 1:
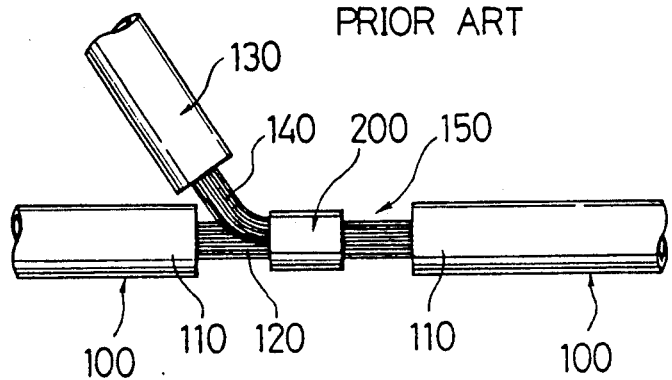
FIG. 1 is a perspective view of a joint section to which a waterproof joint is attached according to the prior art.
Figure 2:
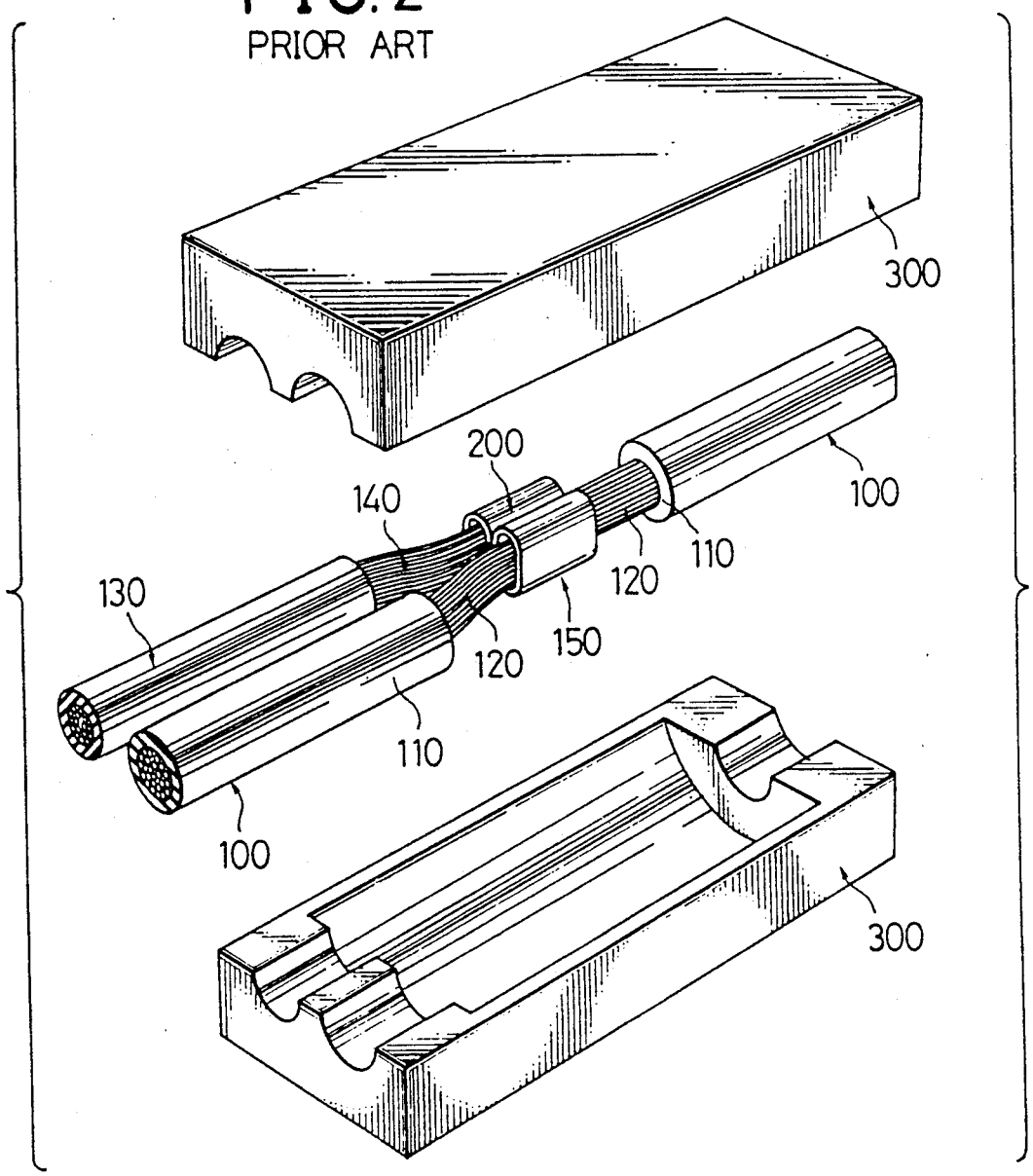
FIG. 2 is a perspective view of a waterproof joint according to the first prior art, in which molding dies and injection molding equipment are employed.
Figure 3:
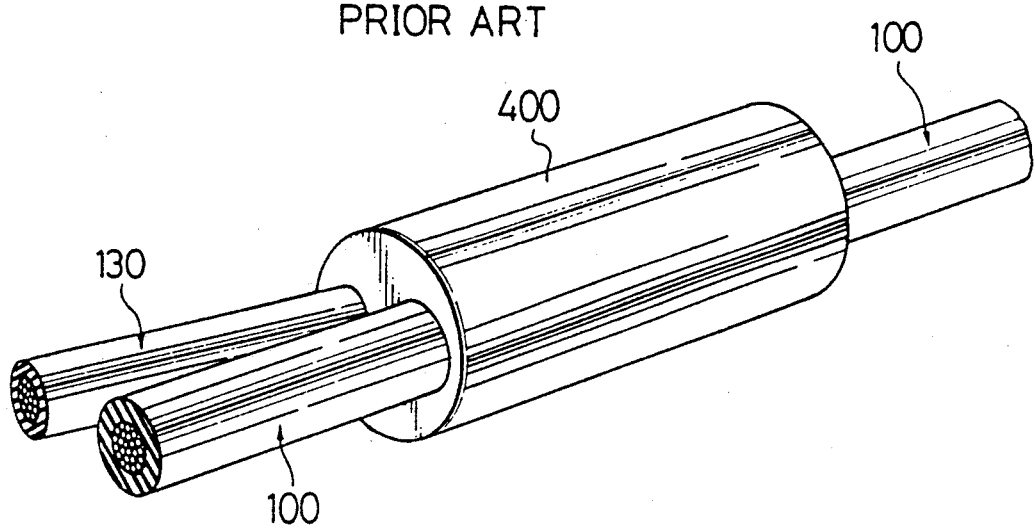
FIG. 3 is a perspective view showing the condition that the waterproof joint of the first prior art are attached to the wireharness.
Figure 4A:
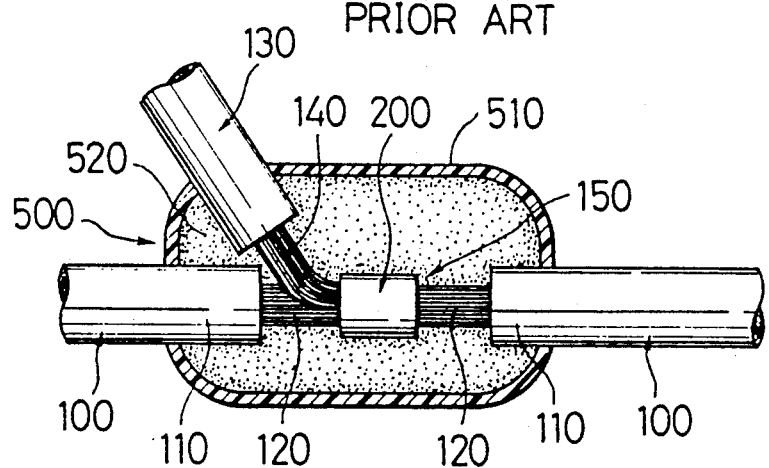
FIGS. 4(a) and 4(b) show, respectively, a cross-sectional view of a waterproof joint according to a second prior art, in which a joint section is covered by a sealing member.
Figure 4B:
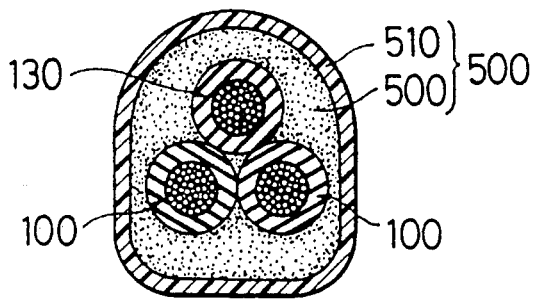
Figure 5:
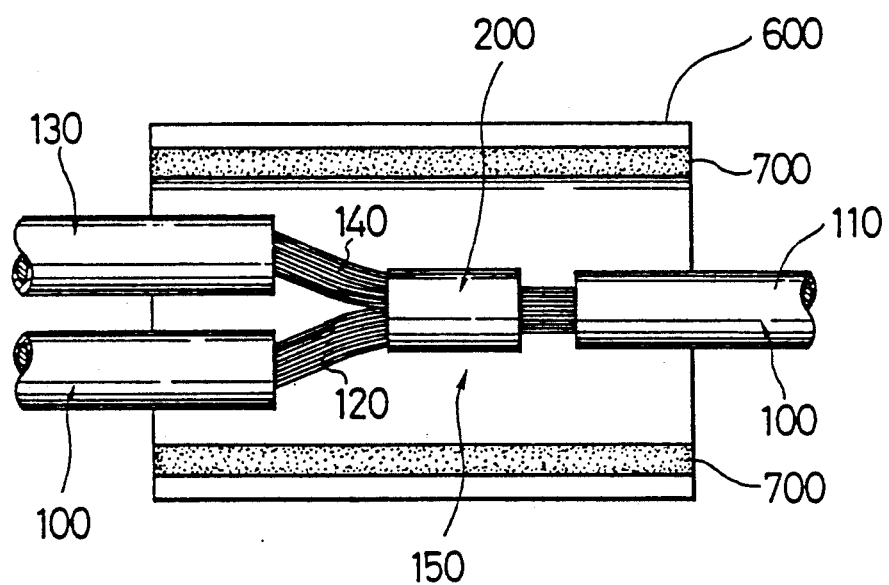
FIG. 5 is a cross-sectional view of a third prior art, in which a thermally shrinkable tube having a thermally shrinkable sheet and a thermoplastic layer applied on the sheet is used.
Figure 6A:
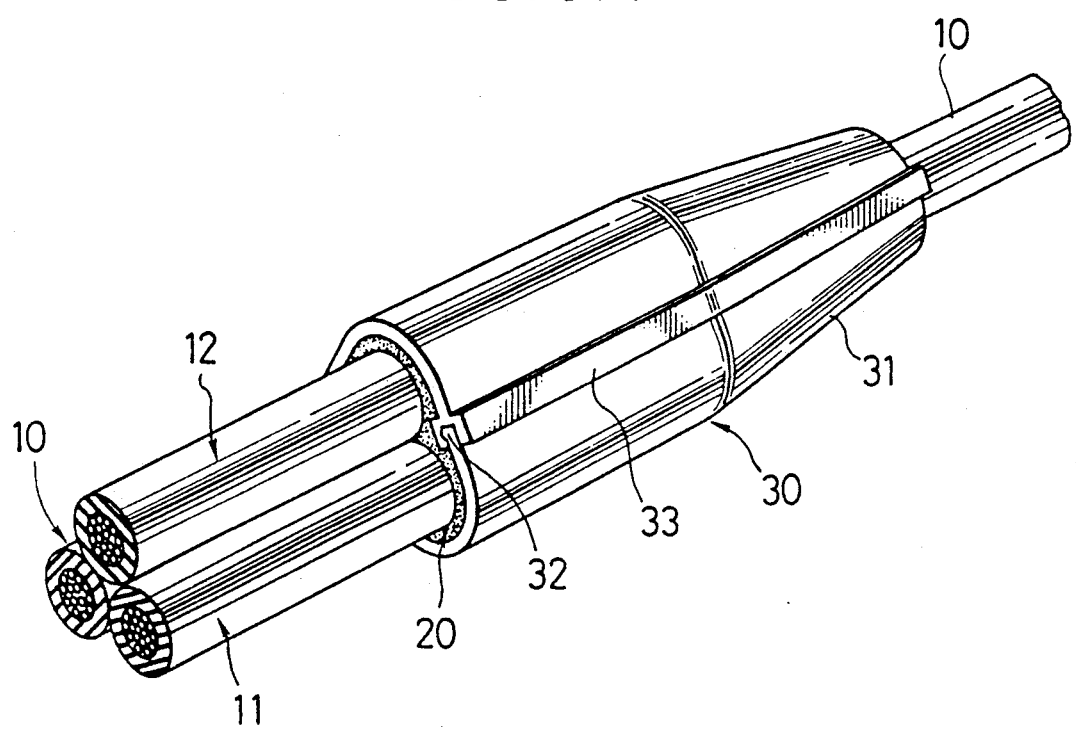
FIG. 6A is a perspective view of a waterproof joint for a wireharness according to a first embodiment of the present invention.
Figure 6B:
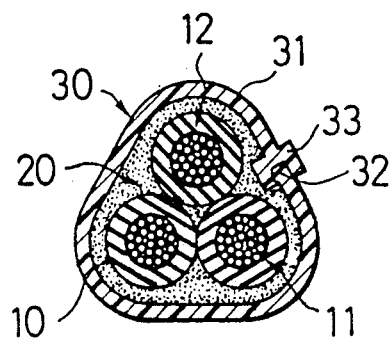
FIG. 6B is a cross-sectional view of the waterproof joint of the first embodiment.

When the thermally shrinkable member 30 is cooled, as shown in FIGS. 6A and 6B, the thermally shrinkable member 30 seals and covers the joint section A entirely. Namely, in this condition, inside the thermally shrinkable sheet 31, the melted thermoplastic resin of the molding chip 20 and the thermally shrinkable layer 34 serves not only to seal and cover the connection portion of the conductors and the insulating covers of the wires of the joint section A entirely without leaving any gaps therein, but also to bond the wires with the thermally shrinkable sheet 31 together and the wires to each other.

As a result, according to this embodiment, since molding dies and an injection molding apparatus are not necessary, the cost for such equipment can be omitted and associated parts control are eliminated. Further, even if the diameters of the wires to be covered by the joint are different from each other or the number of the wires are increased, this has no adverse effects on the sealability or waterproofness of the waterproof joint of the present invention.

Further, according to this embodiment, since at least one molding chip 20 is provided in addition to the thermally shrinkable layer 34 of the thermally shrinkable joint member 30, the melted thermoplastic resin of the molding chip 20 and the layer 34 can penetrate and extend throughout the joint section. Further, in this case, since the shrinking force of the thermally shrinkable sheet 31 assists in the penetration of the melted thermoplastic resin, it becomes possible to automatically force the melted resin throughout the waterproof joint without manual operation like the second prior art, so that the productivity of the waterproof joint can be remarkably improved. In this case, since the melted resin is forcibly extended within the waterproof joint under the pressure of the shrinking force from the shrinkable sheet 31, it is possible to prevent any gaps or spaces from being left therein, thus leading to improvement in sealability and waterproofness in the waterproof joint.

FIGS. 11 to 14 show a second embodiment of the waterproof joint according to the present invention. Since the basic structure of the waterproof joint of the second embodiment is similar to that of the first embodiment, a detailed description for the same structure is believed to be unnecessary if the same reference numerals are allotted to the same components for both embodiments.

Figure 12A:
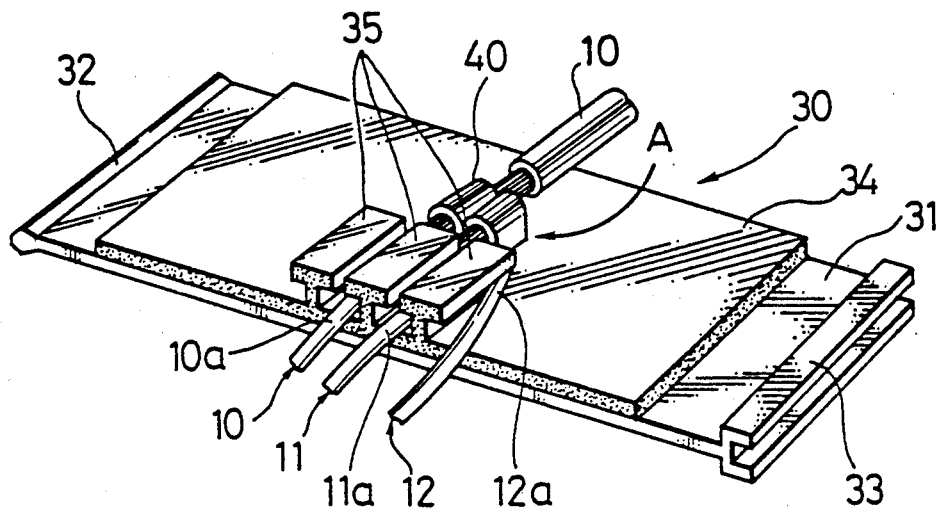
FIGS. 12A to 12C show the conditions in which the waterproof joint of the second embodiment is actually used.
Figure 12B:
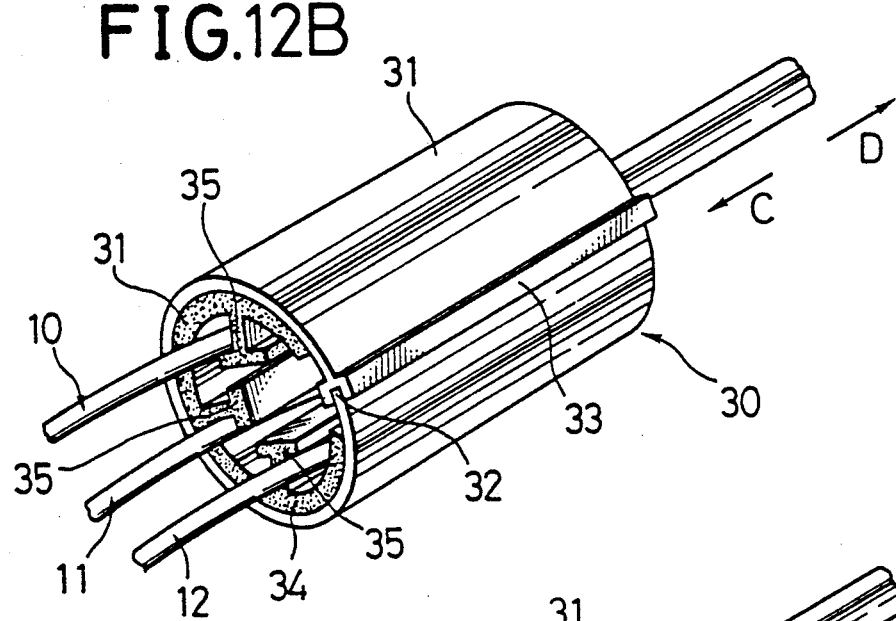

The feature of the second embodiment resides in the provision of a plurality of T-shaped rib portions 35 integrally provided on a thermally shrinkable layer 34 of a thermally shrinkable joint member 30. The plurality of T-shaped rib portions 35 are juxtaposed with each other so as to have a small space therebetween. Each of the T-shaped rib portions 35 extends toward the cross direction of the thermally shrinkable member 30 from one longitudinal end thereof and has a length of substantially half of the width of the thermally shrinkable joint member 30. Therefore, as shown in FIG. 12A, there is provided a pass between the adjacent rib portions 35, through which the wires are passed. This means that since branch portions between the wires which are connected together at a connecting portion thereof are abutted against the T-shaped rib portions 35 when the wires are passed into the passes, respectively, the connecting portion of the conductors of the wires is properly positioned at the center of the thermally shrinkable member 30. Further, due to the rib portions 35, the wires are restricted to be moved toward the directions indicated by the arrows C and D in FIG. 12B. In other words, the T-shaped rib portions 35 serve as positioning means for the joint section with respect to the thermally shrinkable member 30. The number of the T-shaped rib portions 35 can be decided in accordance with the number of wires to be covered by the waterproof joint.

Each T-shaped rib portion 35 is formed from a thermoplastic resin material which is the same as that of the thermally shrinkable layer 34. Therefore, the rib portions 35 will be melted when heat is applied to the thermally shrinkable joint member 30. In other words, the rib portions 35 also serve as the molding chips 20 of the first embodiment.

Figure 14A:
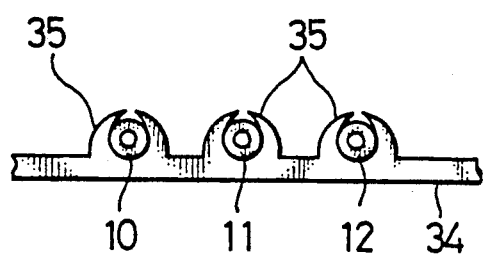
FIGS. 14A to 14C are cross-sectional views of modifications of the waterproof joints according to the second embodiment.
Figure 14B:
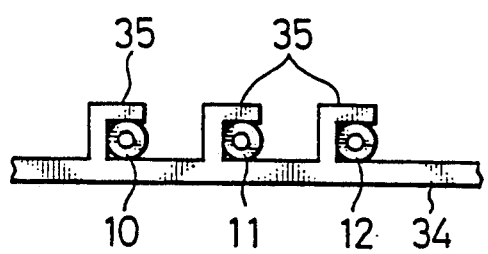
Figure 14C:
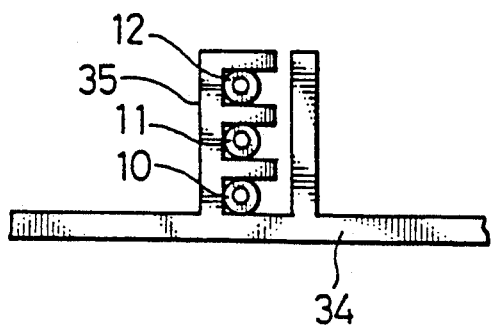

In this embodiment, it is possible to modify the shape of each rib portion 35 as illustrated in FIGS. 14A to 14C. Namely, in the modification shown in FIG. 14A, the rib portions 35 are formed as a plurality of C-shaped rib portions each having an elongated slot into which a wire is supported, in the modification in the modification shown in FIG. 14B they are formed from L-shaped rib portions, and in the modification shown in FIG. 14C they are formed from a combination of a plate-like rib portion and E-shaped rib portions. Other modifications can be introduced as long as it is possible to support separately the insulating cover of a wire from other insulating covers of wires and position the connecting portion of the conductor at the central portion of the thermally shrinkable layer 34.

When the waterproof joint of this embodiment is used in order to seal the joint section A in which the wires 10, 11 and 12 are connected together through the joint member 40, first as shown in FIG. 12A, the insulating covers 10a, 11a and 12a of the wires 10, 11 and 12 in the joint section A are passed between the T-shaped rib portions 35 so as to place, the connecting portion of the conductors of the wires on which the joint member 40 is mounted to a central portion of the thermally shrinkable layer 34. Therefore, the set position of the joint section of the wireharness can be automatically and correctly decided.

Thereafter, the thermally shrinkable sheet 31 of the thermally shrinkable member 30 is rolled in such a manner that the thermally shrinkable layer 34 is located inside of the rolled shrinkable sheet 31, and then an engaging protrusion 32 of the thermally shrinkable member 30 is engaged with an engaging groove 33, so that the thermally shrinkable joint member 30 is attached to the joint section A. In this condition, heat at a temperature that will not melt the insulating covers 10a, 11a and 12a but melt only the thermoplastic material of the thermally shrinkable layer 34 and the T-shaped rib portions 35 is applied to thereto. Then, the thermally shrinkable sheet 31 is shrunk and the thermoplastic resin of the thermally shrinkable layer 34 and the T-shaped rib portions 35 is melted. The melted thermoplastic resin then penetrates into any gaps or spaces between the wires. In this case, in the same manner as the first embodiment, the pressure caused by the shrinking force from the thermally shrinkable sheet 31 assists in the penetration of the melted thermoplastic resin into the gaps.

Figure 12C:
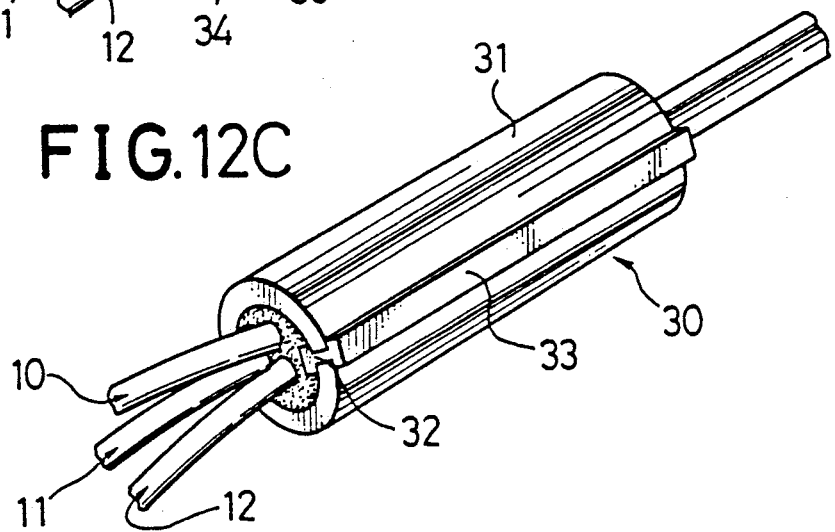
Figure 13A:
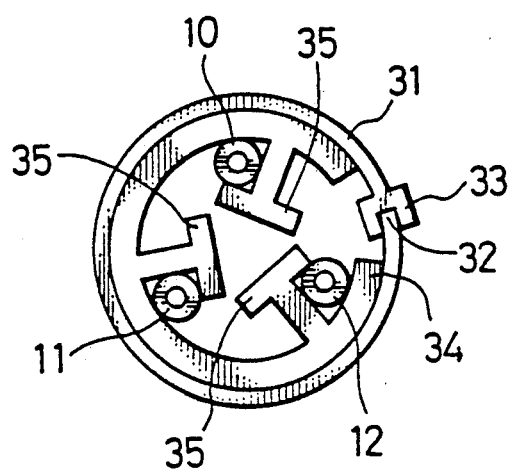
FIGS. 13A and 13B are a cross-sectional view and a side view of the waterproof joint of the second embodiment, respectively.
Figure 13B:
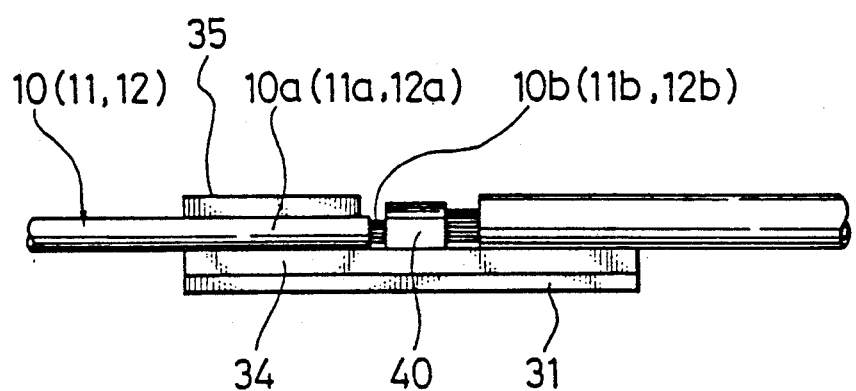

When the thermally shrinkable joint member 30 is cooled, as shown in FIG. 12C, the thermally shrinkable joint member 30 sealingly covers the joint section A entirely. Namely, in this condition, inside the thermally shrinkable sheet 31, the melted thermoplastic resin of the thermally shrinkable layer 34 and the T-shaped rib portions 35 serves not only to cover the connection portion of the conductors and the insulating covers of the wires of the joint section A entirely without leaving gaps therein, but also to bond the wires with the thermally shrinkable sheet 31 and the wires with each other.

According to this embodiment, since the joint section A can be automatically positioned with respect to the thermally shrinkable joint member 30 when attached, no positional shift between the joint section A and the thermally shrinkable joint member 30 will be caused. Further, according to this embodiment, since it is not necessary to perform a step for attaching a molding chip to the wire before the thermally shrinkable member 30 is attached, the manufacturing process for the waterproof joint becomes simple, thus leading to an improvement in productivity.

It will be apparent from the foregoing description that the waterproof joint of the present invention has a number of advantages, some of which have been described above. Also, obvious modifications and variations can be made to the waterproof joint of the present invention without departing from the scope of the invention as defined by the append claims.

What is claimed is:

1. A waterproof joint for a joint section of a plurality of wires of a wireharness to be connected, each wire having a conductor and an insulating cover surrounding the conductor, the joint section comprising a connecting portion of the conductors and the insulating covers of the wires near the connecting portion, which waterproof joint comprises:

a thermally shrinkable joint member including a thermally shrinkable sheet having an inner surface and a thermoplastic layer of thermoplastic material formed on the inner surface of the thermally shrinkable sheet, the thermally shrinkable joint member being adapted to be wound around the joint section in such a manner that the thermally shrinkable layer faces the joint section;

secondary sealing means formed of a thermoplastic material for filing up spaces between the wires of the joint section when heat is applied thereto in cooperation with the thermoplastic material of the thermoplastic layer, the secondary sealing means being provided within the thermally shrinkable joint member, whereby when heat is applied to the thermally shrinkable joint member the thermally shrinkable sheet is shrunk and the thermoplastic material of the thermally shrinkable layer and the secondary sealing means is melted and spreads within the thermally shrinkable sheet thus sealing spaces between the thermally shrinkable sheet and the wires and filling spaces between the wires by the assistance of a shrinking force in the thermally shrinkable sheet;

means for positioning the joint section with respect to the thermally shrinkable joint member such that the connecting portion of the joint section is placed at the center of the joint member when the joint member is attached to the joint section; and said positioning means formed by the secondary sealing means which comprises a plurality of rib means of thermoplastic material integrally formed on the thermally shrinkable sheet for provisionally supporting the wires of the joint section such that the connecting portion is placed at the center of the thermally shrinkable joint member.

2. The waterproof joint as claimed in claim 1, wherein the rib means comprises a plurality of T-shaped rib portions which are juxtaposed with each other so as to form a pass between the adjacent rib portion into which the wire is passed, and each of the T-shaped rib portions extends toward the cross direction of the thermally shrinkable sheet from one longitudinal edge thereof and has a length that is substantially half the width of the thermally shrinkable sheet.

3. The waterproof joint as claimed in claim 1, wherein the rib means comprises a plurality of juxtaposed C-shaped rib portions each having an elongated slot into which the wire is supported, and each of the C-shaped rib portions extends toward the cross direction of the thermally shrinkable sheet from one longitudinal end thereof and has a length that is substantially half the width of the thermally shrinkable sheet.

4. The waterproof joint as claimed in claim 1, wherein the rib means comprises a plurality of juxtaposed L-shaped rib portions each having an elongated side slot into which the wire is supported, and each of the L-shaped rib portions extends toward the cross direction of the thermally shrinkable sheet from one longitudinal end thereof and has a length that is substantially half the width of the thermally shrinkable sheet.

5. The waterproof joint as claimed in claim 1, wherein the rib means comprises a combination of an E-shaped rib portion having a plurality of shelf portions and an elected wall portion provided in the vicinity of the rib portion in such a manner that a plurality of passes into which the wires are passed are formed in a space defined by the shelf portion and elected wall portion, and both of the E-shaped rib portion and the elected wall portion extend toward the cross direction of the thermally shrinkable member from one longitudinal end thereof and have a length that is substantially half the width of the thermally shrinkable sheet, respectively.

6. A waterproof joint for a joint section of a plurality of wires of a wire harness, each wire having a conductor and an insulating cover surrounding the conductor, the joint section comprising a connecting portion of the conductors and the insulating covers of the wires near the connecting portion, which comprises:

a thermally shrinkable joint member including a thermally shrinkable sheet having an inner surface and a thermoplastic layer of thermoplastic material formed on the inner surface of the thermally shrinkable joint member, the thermally shrinkable joint member being adapted to be wound around the joint section in such a manner that the thermally shrinkable layer faces the joint section;

secondary sealing means formed of a thermoplastic material for filling up spaces between the wires of the joint section when heat is applied thereto in cooperation with the thermoplastic material of the thermally shrinkable layer, wherein when heat is applied to the thermally shrinkable joint member the thermally shrinkable sheet is shrunk and the thermoplastic material of the thermally shrinkable layer and secondary sealing means is melted and spreads within the thermally shrinkable sheet, thus sealing spaces between the thermally shrinkable sheet and the wires and filling spaces between the wires by the assistance of a shrinking force in the thermally shrinkable sheet; and means for positioning the joint section with respect to the thermally shrinkable joint member such that the connecting portion of the joint section is placed substantially at the center of the thermally shrinkable joint member when the thermally shrinkable joint member is attached to the joint section, the positioning means being formed by the secondary sealing means integrally formed on the thermally shrinkable sheet.

7. The waterproof joint as claimed in claim 6, wherein the thermoplastic material of the thermally shrinkable layer and secondary sealing means is adapted to melt at a temperature which is lower than the melting temperature of the insulating cover of the wire.

8. The waterproof joint as claimed in claim 6, wherein the thermoplastic material is a composition comprising a thermoplastic polymer, plasticizer and tackifiers.

9. The waterproof joint as claimed in claim 6, wherein the thermally shrinkable sheet has a substantially rectangular shape having two sets of opposite edges, and the thermally shrinkable sheet has means for engaging the opposite two edges to be mated so as to form a cylindrical shape when the sheet is wound around the joint section.

10. The waterproof joint as claimed in claim 9, wherein the engaging means comprises an engaging protrusion formed on one of the opposite edges and an engaging groove with which the engaging protrusion is to be engaged formed on the other opposite edge.

11. The waterproof joint as claimed in claim 6, wherein the secondary sealing means is formed from a plurality of rib means of thermoplastic material integrally formed on the thermally shrinkable sheet.

12. The waterproof joint as claimed in claim 7, wherein the thermally shrinkable sheet has two opposite longitudinal edges, in which the plurality of rib means extend toward the cross direction of the thermally shrinkable sheet from one of the longitudinal edges thereof and has a length of substantially half of the width of the thermally shrinkable sheet.

13. The waterproof joint as claimed in claim 12, wherein the rib means comprises a plurality of T-shaped rib portions which are juxtaposed with each other so as to form a pass between the adjacent rib portions into which the wire is supported.

14. The waterproof joint as claimed in claim 12, wherein the rib means comprises a plurality of juxtaposed C-shaped rib portions each having an elongated slot into which the wire is supported.

15. The waterproof joint as claimed in claim 12, wherein the rib means comprises a plurality of juxtaposed L-shaped rib portions each having an elongated side slot into which the wire is supported.

16. The waterproof joint as claimed in claim 12, wherein the rib means comprises a combination of an E-shaped rib portion having a plurality of shelf portions and an elected wall portion provided in the vicinity of the rib portion in such a manner that a plurality of passes into which the wires are supported are formed in a space defined by the shelf portion and elected wall portion.

* * * * *